United States Patent
Huang et al.

(10) Patent No.: US 8,137,792 B2
(45) Date of Patent: Mar. 20, 2012

(54) WATER RESISTANT ADHESIVE AND METHODS OF USE

(75) Inventors: Tianjian Huang, Hillsborough, NJ (US); Frank Swiezkowski, Hamilton Square, NJ (US)

(73) Assignee: Henkel Corporation, Rocky Hill, CT (US)

( * ) Notice: Subject to any disclaimer, the term of this patent is extended or adjusted under 35 U.S.C. 154(b) by 561 days.

(21) Appl. No.: 12/209,611

(22) Filed: Sep. 12, 2008

(65) Prior Publication Data

US 2010/0068544 A1 Mar. 18, 2010

(51) Int. Cl.
*B32B 3/28* (2006.01)
(52) U.S. Cl. .................................. 428/182; 428/530
(58) Field of Classification Search .................. 428/182, 428/522, 526, 530; 524/503, 557
See application file for complete search history.

(56) References Cited

U.S. PATENT DOCUMENTS

| | | |
|---|---|---|
| 3,300,360 A | 1/1967 | Williams et al. |
| 4,374,217 A | 2/1983 | Miyake et al. |
| 4,561,918 A | 12/1985 | Scharfenberg et al. |
| 6,559,236 B1 | 5/2003 | Willimann et al. |
| 7,163,579 B2 * | 1/2007 | Muvundamina ......... 106/205.31 |
| 2006/0211805 A1 | 9/2006 | Willimann et al. |
| 2007/0117927 A1 | 5/2007 | Han et al. |

OTHER PUBLICATIONS

Sprague, C.H. et al. "Development of a Cold Corrugating Process—Final Report". Georgia Institute of Technology. May 1985.

* cited by examiner

*Primary Examiner* — Donald J Loney
(74) *Attorney, Agent, or Firm* — Sun Hee Lehmann

(57) ABSTRACT

The invention provides the art with an adhesive that may advantageously be used in the manufacture of water resistant paperboard products, such as laminated board and corrugated board. The adhesive has the required tack, water resistance and viscosity that allows its use at commercial speeds in a cold corrugating process.

3 Claims, 2 Drawing Sheets

WATER RESISTANT ADHESIVE AND METHODS OF USE

FIELD OF THE INVENTION

Figure 1:
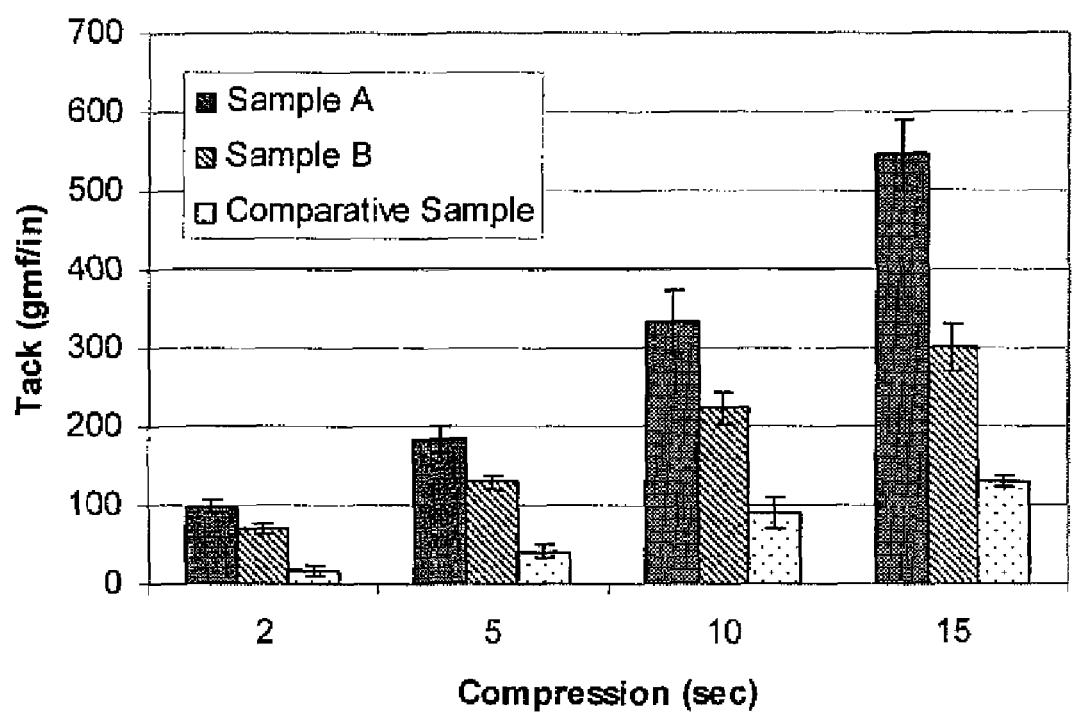

The invention relates to a water resistant adhesive that may be used to prepare paperboard products, including moisture resistant corrugated board. The adhesive may advantageously be used in a cold corrugating system in which corrugated board can be prepared without the need to apply heat following application of the adhesive to the paper substrates.

BACKGROUND OF THE INVENTION

Corrugated paper board is commonly prepared by first forming a corrugated element or medium by passing a cellulosic sheet between corrugating rolls forming a substantially sinusoidal or serpentine cross-section in the sheet. An adhesive is commonly applied to the tips of the thus formed sinusoidal portion called flutes and a noncorrugated or planar cellulosic liner is applied against the adhesive coated flutes of the corrugated elements as the corrugated sheet passes between a corrugating roll and a pressure roil. The resulting paper product having the corrugating medium on one side and the planar liner on another side is called a single-faced web. The single-faced element may be used as is in certain applications as a liner or buffer material within a container. More commonly adhesive is applied to the flute tips of the single-faced web and a second liner sheet is subsequently applied to the fluted medium in a "double facer" operation. The second liner sheet is exposed to conditions of heat and pressure during its contact with the adhesive. In practice, the sheet of corrugated cardboard most frequently encountered has two plane sides placed on each side of the corrugated medium. Depending on the specific strength desired, a sheet of corrugated cardboard may also be provided with a more complex structure, such as two corrugated medium and three plane surfaces, two outer ones and one inner one separating the two corrugated medium. This is referred to as double wall board.

Starch-based adhesives are most commonly used in the corrugating process due to their desirable adhesive properties, low cost and ease of preparation. The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In conventional corrugating processes, the adhesive is applied (usually at between 25° and 55° C.) to the tips of the fluted paper medium or single-faced board, whereupon the application of heat and pressure causes the raw starch to gelatinize, resulting in an instantaneous increase in viscosity and formation of the adhesive bond. In other words, the adhesive is applied while relatively cool and then, subsequently, requires the application of high temperatures at the points of bonding to effect in situ gelatinization of the raw starch granules, a process that is lacking in both efficiency and economy. This method of forming corrugated board is commonly referred to as the "Stein-Hall process".

While certain prior art "cold" corrugating methods using starch-based adhesives have been suggested in order to eliminate the need for heating systems required for setting the adhesive, such process have not proven to be commercially viable. See, U.S. Pat. Nos. 3,300,360, 4,374,217, 4,561,918, and Clyde H. Sprague, Institute of Paper Chemistry, "Development of a Cold Corrugating Process—Final Report" (May 1985). Use of heat/heating systems is still conventional in the corrugating arts.

There continues to be a need in the art for corrugating methods and means, including processes designed to eliminate or at least minimize the amount of heat/heating systems required to prepare good quality moisture/water resistant corrugated board. There is also a need in the art for novel corrugating adhesives that enable production of moisture resistant board and that can be run "cold," i.e., without the required use of added heat.

SUMMARY OF THE INVENTION

The invention provides a water based adhesive comprising a noncrosslinkable ethylene vinyl acetate polymer, a crosslinkable ethylene vinyl acetate polymer, a crosslinking agent, and water. The adhesive of the invention has a solids content greater than 40%, and a Brookfield viscosity (20 rpm, 72° F.) greater than 700 cps and can be used to prepare water resistant corrugated board at commercial line speeds.

In one embodiment the adhesive of the invention comprises a crosslinkable ethylene vinyl acetate polymer selected from the group consisting of ethylene vinyl acetate polymers containing carboxy functional groups, ethylene vinyl acetate polymers containing N-methylol acrylamide functional groups, and mixtures thereof. In a preferred embodiment the adhesive comprises, based on the amount of solids, from about 25 to about 35 wt % of a polyvinyl alcohol and surfactant stabilized ethylene vinyl acetate resin emulsion, from about 22 to about 28 wt % of a polyvinyl alcohol and surfactant stabilized carboxy functional ethylene vinyl acetate resin emulsion, from about 3 to about 7 wt % of a polyvinyl alcohol and surfactant stabilized N-methylol acrylamide containing ethylene vinyl acetate resin emulsion, up to about 5 wt % of a plasticizer, and optionally a preservative and/or defoamer. The adhesive will contain from about 35 to about 60 wt % water.

The invention also provides the art with a process for manufacturing a water resistant paperboard product. The process of the invention comprises applying a thin layer of a synthetic waterborne adhesive to a first and/or second substrate, which first and second substrates are independently selected from the group consisting of corrugated mediums and liner boards. The first substrate and second substrate are brought together such that said adhesive layer is located between the first substrate and the second substrate, and whereby the first substrate becomes bonded to the second substrate. The adhesive used will have a solids content of greater than 40%, a Brookfield viscosity (20 rpm, 72° F.) greater than 700 cps, and will be applied to the substrate at a wet coat weight of less than 0.004 inch and will have a 2 second tack at 72° F., 50% Relative Humidity, of at least 50 gram force per linear inch flute length at an application level of 1.5 dry lbs/msf or less. Preferred adhesives will comprise a noncrosslinkable ethylene vinyl acetate polymer, a crosslinkable ethylene vinyl acetate polymer, and a crosslinking agent. The crosslinkable ethylene vinyl acetate polymer will preferable be selected from the group consisting of ethylene vinyl acetate polymer containing carboxy functional groups, ethylene vinyl acetate polymer containing N-methylol acrylamide functional groups functional groups, and mixtures thereof. A particularly preferred adhesive for use in the practice of the invention will comprise, based on the amount of solids, from about 25 to about 35 wt % of a polyvinyl alcohol and surfactant stabilized ethylene vinyl acetate resin emulsion, from about 22 to about 28 wt % of a polyvinyl alcohol and surfactant stabilized carboxy functional ethylene vinyl acetate resin emulsion, from about 3 to about 7 wt % of a polyvinyl alcohol and surfactant stabilized N-methylol acrylamide containing ethylene vinyl acetate resin emulsion, up to about 5 wt % of a plasticizer, and optionally a preservative and/or defoamer. The adhesive will contain from about 35 to about 60 wt % water. The adhesive can bond a first substrate to a second substrate in the absence of added heat.

In one embodiment, the paperboard product is a corrugated board comprising at least one corrugated medium and at least one liner board. In one specific embodiment, the corrugated medium is bonded to at least one liner board using the adhesive of the invention.

BRIEF DESCRIPTION OF THE DRAWING FIGURES

FIG. 1 shows wet tack comparisons of adhesives of the invention versus a prior art resin based cold corrugating adhesive.

Figure 2:
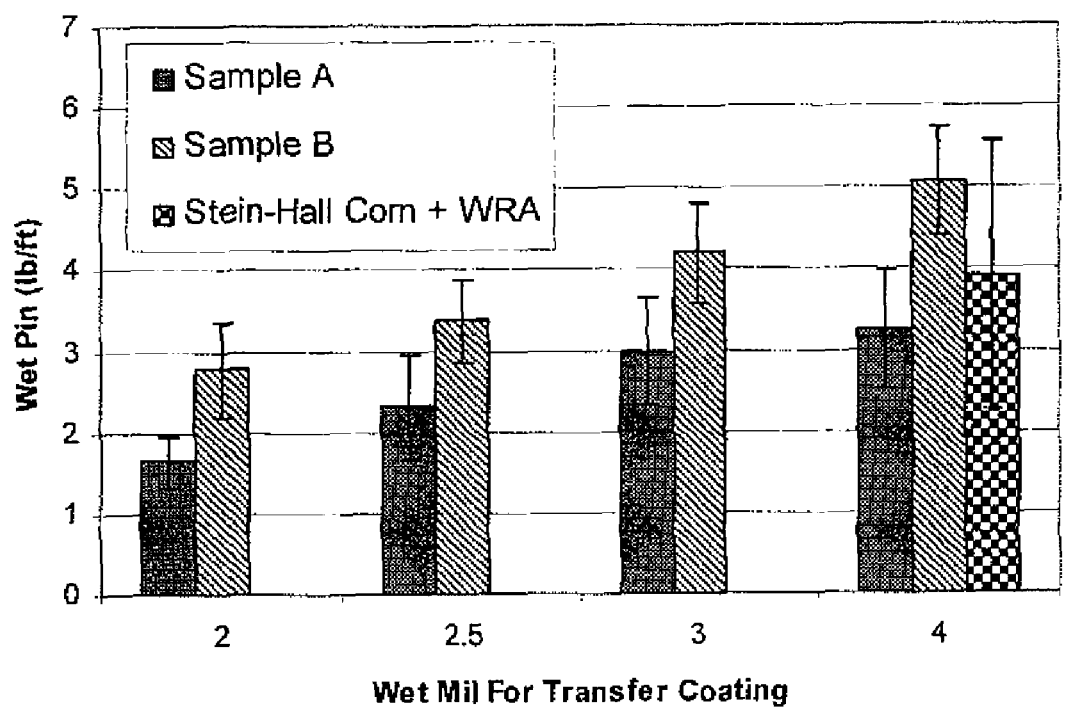

FIG. 2 compares water resistance of adhesive of the invention with a conventional water resistant Stein-Hall adhesive.

DETAILED DESCRIPTION OF THE INVENTION

All documents cited herein are incorporated in their entireties by reference.

The Stein-Hall process of gelatinizing corn starch between the flute tips and the liner boards with high heat, high pH/Boration, and high pressure was invented in 1934 and quickly took over the corrugating industry and became a standard (and mature) method. The problem, if any, is that the process depends on heat transfer and for double or triple wall constructions the line speed has to be dramatically reduced (e.g., from 1,000 fpm to 300 fpm). In recent years the energy cost as well as the cost of corn starch has gone up steeply. As such, the corrugating industry is looking at viable alternatives.

The invention is directed to water resistant adhesives that are particularly well suited for the manufacture of corrugated paperboard using a cold corrugating method. The adhesive of the invention comprises a combination of high solid emulsion polymers, solution polymer and cross-linkable polymers that result in a balance of high wet tack and high water resistance.

The adhesives of the invention can advantageously be used in a cold corrugating system and enable the manufacture of corrugated board without the need to apply heat following application of the adhesive to the flute tips or liner of the corrugated board. The invention thus provides the art with corrugated board that exhibits good water/moisture resistance and that can be prepared in an economical and energy efficient manner.

The invention provides the art with a synthetic waterborne adhesive useful in cold corrugating processes to substantially reduce or even eliminate the heat associated with conventional corrugating processes.

"Cold corrugating" is defined and used herein to mean a process wherein no additional heat, other than the heat present in the adhesive, must be applied to the board during the actual bonding of the corrugated tips to the liner board. It will be recognized and understood that other sources of heat and residual heat, for example heat used in other steps of the corrugating process such as that used for flute formation, may be present. It will also be recognized that while no additional source of heat is required to practice the process of the invention, heat may be added if desired, or as a method of warp control.

Water resistance is used herein to mean that the synthetic adhesive of the invention provides water resistance to a formed corrugated board that is substantially equivalent to that obtainable using a water resistant starch based corrugating adhesive in the Stein Hall process, specifically a corrugating adhesive formulated with pearl starch and which contains a conventional Stein Hall water resistant additive such as a ketone aldehyde.

The synthetic adhesive is applied at a low application level, preferably using a metering device. The method of the invention comprises applying to the tips of flutes of a corrugated paper a thin layer of synthetic adhesive, applying a liner to the adhesive coated tips of the corrugated paper and allowing the adhesive to dry in the absence of additional heat. Alternatively, the adhesive may be applied/coated onto the surface of a liner board, the liner is applied to the corrugated flute tips, and the adhesive is allowed to dry. The adhesive may be applied to specific sections of the liner, or to the entire surface area of the liner. Application of an adhesive of the invention, which is a water resistant synthetic adhesive, to the entire surface of the liner board provides excellent water resistance.

The adhesive of the invention is characterized as having a solids content of greater than about 40% and a 2 second tack, at 72° F., 50% Relative Humidity (RH), of at least 50±2 gram force per linear inch flute length at an application level of 1.5 dry lbs/msf or less. In one embodiment the adhesive has a 5 second tack (at 72° F., 50% RH) of at least 80 grams/in. In another embodiment the adhesive has a 10 second tack (at 72° F., 50% RH) of at least 150 grams/in.

The invention provides the art with a corrugating operation that can be run at ambient conditions, therefore significantly reduces energy costs currently encountered with the hot process being practiced today. The resulting corrugated boards exhibit excellent water resistance that can be produced in an economical and cost and energy effective manner.

The invention provides the art with a high wet tack, high water resistant and clean running waterborne adhesive that can be used in cold setting corrugating applications at conventional line speeds. The adhesives of the invention can be applied to either the flute tips of the medium or continuously to the liner paper at high line speeds (greater than at least 450 fpm) and has excellent machining characteristics that allow it to be metered down to give exceptional high mileage and to be clean running.

The subject invention provides waterborne synthetic adhesives that save energy cost for the corrugating industry and at the same time maintains high line speed for double and triple wall constructions and water resistance.

The invention provides a water resistant synthetic adhesive approach to running corrugators cold. It has been discovered that synthetic adhesives, when applied via a thin film, will allow corrugators to produce corrugate board without heat at conventional line speeds. This technology offers advantages in improvements in the product, process, and economics of the corrugating business.

Benefits obtained by the method of the invention include heat energy reduction, improved worker safety, improved quality and throughput, and fiber reduction of the corrugate construction. End-use properties of the corrugate construction obtainable when using the invention, such as edge crush, pin values and overall appearance, are comparable to standard hot starch adhesives currently and conventionally used in the art of corrugated board construction.

The adhesives used in the process of the invention are applied to the flutes of a corrugated board, or to a liner board at very thin coat weight. In one preferred embodiment, a smooth applicator roll is used to apply the adhesive at a thin coat weight.

Application of a thin layer of adhesive will typically require the use of a metering device or system. Sufficiently thin layers of adhesive may be deposited using meter systems that are commercially available, such as the ISO-BAR rod coaters that are available from CSI KOHLER COATING, Uniontown, Ohio. Adhesive can be thinly applied such that no further reduction in water content, such as through foaming of the adhesive or application of heat is required, although these methods may still be used if so desired.

It has been discovered that synthetic waterborne corrugating adhesives can be used to prepare corrugated board using a cold corrugating process. The synthetic waterborne adhesive useful in the practice of the invention is characterized in having a solids content of greater than about 40%, more typically a solids content of from 45 to about 65%, and a 2 second tack (at 72° F., 50% RH) of at least 50±2 gram force per linear inch flute length at an application level of 1.5 dry lbs/msf or less. In one embodiment the adhesive has a 5 second tack (at 72° F., 50% RH) of at least 80 grams/in. In another embodiment the adhesive has a 10 second tack (at 72° F., 50% RH) of at least 150 grams/in. The synthetic adhesive is formulated to have a Brookfield viscosity greater than 700 cps at 72° F., 20 rpm. In one embodiment, the adhesive used in the practice of the invention has a viscosity greater than 1000 cps at 72° F. In another embodiment, the adhesive used in the practice of the invention has a viscosity greater than 2000 cps at 72° F. The synthetic adhesive of the invention will typically be applied to the substrate (to the tips of the corrugated medium or to the liner board) at a coat weight of less than 0.004 inch (4 mils). In one embodiment the adhesive is applied at a coat weight of from between 0.0005 to 0.0035 inch. The adhesive will typically and conveniently be applied to the substrate surface using a metering device that lays down a predetermined amount of adhesive onto the surface of the substrate. While no foaming is required, if desired, the adhesive may be foamed by introduction of air into the adhesive. It is to be understood that the above recited viscosity and coating weight requirements refers to the viscosity of the adhesive in the unfoamed state.

Formulations will have a Brookfield viscosity of greater than 1000 cps, most typically between 1000 and 4000 cps, at 72° F. and 20 rpm. The formulations of the invention generally will have a viscosity stability of at least 3 months, more typically at least 6 months. Formulations are considered stable if there is less than a 10% change in viscosity. The formulated adhesives will have a 2 second tack (at 72° F., 50% RH) of at least 50±2 gram force per linear inch flute length at an application level of 1.5 dry lbs/msf or less. Tack is determined by the method described in the accompanying Examples.

While U.S. Pat. No. 4,561,918 (Scharfenberg et al.) discloses the use of a synthetic adhesive for use in a cold corrugating process, the adhesive must be foamed. Useful adhesives are described in this patent as having a viscosity, in the unfoamed state, of 250 to 700 cps, more typically 300-325 cps, at 25° C. and are applied at a coat weight down to about 0.004 inch (4 mil). Moreover, the Scharfenberg et al. adhesive formulation is not water resistant.

The adhesive composition of the invention comprises a combination of high solid emulsion polymers, solution polymers, and crosslinkable polymers that enables the achievement of high wet tack and high water resistance. Particularly preferred are mixtures of ethylene vinyl acetate (EVA) emulsion polymers, carboxylated ethylene vinyl acetate emulsion polymers, ethylene vinyl acetate emulsion polymers containing N-methylol acrylamide (NMA) functional groups, a medium molecular weight partially hydrolyzed polyvinyl alcohol (PVOH), and a catalyst to crosslink NMA, carboxyl groups and the polyvinyl alcohol.

Useful vinyl acetate copolymers are copolymers of ethylene and vinyl acetate with ethylene contents of preferably about 1 to 60%, more preferably between about 5 and 25%, and/or acrylates. The particles can be stabilized by one or more stabilizers such as modified and/or unmodified, fully and/or partially hydrolyzed polyvinyl alcohol with degree of hydrolysis of preferably about 70 to 100 percent, more preferably between about 80 and 98 percent and their derivatives, polyvinyl pyrrolidone with molecular weights of preferably about 2,000 and 400,000, cationic or anionic stabilization systems obtained by monomers such water-soluble polymers obtained from poly(meth)acrylic acid, polyvinylsulfonic acid as well as stabilizing systems as described, e.g., in EP-A 1098916, EP-A 1109838, melaminformaldehydesulfonates, naphthalinformaldehydesolufonates, styrene maleic acid- and vinylether-maleic acid copolymers, cold-water-soluble polysaccharides such as cellulose, starch (amylose and amylopectine), guar, dextrins, which can be modified by, e.g., carboxymethyl, carboxyethyl, hydroxyethyl, hydroxypropyl, methyl, ethyl, propyl and/or longer chain alkyl groups, alginates, peptides and/or proteins such as gelatine, casein and/or soja proteins. Preferred are partially or fully hydrolyzed polyvinyl alcohol, dextrines and/or hydroxyalkyl cellulose as particle stabilizers. Surfactants may also be used, if desired, as protective colloids.

The adhesives of the invention will include a non-crosslinkable acetate polymer, a crosslinkable acetate polymer and a crosslinking catalyst (e.g., acid catalyst).

The adhesive will preferably comprise all vinyl-acetate copolymers. Particularly preferred adhesive formulations comprise ethylene vinyl acetate containing polyvinyl alcohol colloidal groups. These copolymers are typically synthesized from, but not limited to, vinyl acetate and N-methylol acrylamide (NMA). Other copolymers in the NMA family that can be used to prepare acetate copolymers include N-methylolmethacrylamide (NMMA), N-(alkoxymethyl)-acrylamides, N-(alkoxymethyl)-methacrylamides and esters of N-methylol(meth)acrylamide.

Non-crosslinkable polymers include but are not limited to vinyl acetate homopolymers and ethylene vinyl acetate copolymer. Both water soluble and non-water soluble polymers are contemplated for use.

The crosslinkable polymer may be N-methylol acrylamide (NMA) containing polymer or a polymer containing functional groups containing reactive hydrogen moieties, such as —COOH, —OH and —NH$_2$. Those of skill in the art would recognize other suitable crosslinkable polymers and crosslinking agents that can be used in the practice of the invention. Crosslinkable acetate polymers for use in adhesive include but are not limited to NMA-vinyl acetate copolymer, NMMA vinyl acetate copolymer and NMA-ethylene-vinyl acetate copolymer.

The copolymers are formulated with a crosslinker for cohesive strength as well as for water resistance. The reactive nature of the functional groups help crosslinking so as to give cohesive strength.

Other components typical of adhesive compositions may be added to the compositions. Such additives include, but are not limited to, plasticizers, acids, waxes, synthetic resins, tackifiers, defoamers, preservatives, bases such as sodium hydroxide, fillers, dyes, pigments, UV indicators, crosslinkers, rheology modifiers and other additives commonly used in the art.

The adhesive may also contain a surface-active agent. Examples of surface-active agents include anionic, cationic, amphoteric, or nonionic surfactants, or mixtures thereof. Suitable anionic surfactants include, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, and esters of sulfosuccinic acid. Suitable cationic surfactants include, alkyl quaternary ammonium salts, and alkyl quaternary phosphonium salts. Suitable non-ionic surfactants include the addition products of 5 to 50 moles of ethylene oxide adducted to straight-chain and branched-chain alkanols having 6 to 22 carbon atoms, alkylphenols, higher fatty acids, higher fatty acid amines, primary or secondary higher alkyl amines, and block copolymers of propylene oxide with ethylene oxide, and mixtures thereof. When used, the surface active agent will typically be added in amounts up to about 20% by weight, based on the composition as a whole. More usually from amounts of from about 0.05 to about 20% by weight, and preferably at from 0.2 to 2% by weight.

Suitable fillers are those fillers known in the art as adhesives fillers and include polysaccharides, calcium carbonate, clay, mica, nut shell flours, silica, talc and wood flour. Clay filler may typically be used to prepare adhesives for use in the practice of the invention.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from 0.05% to about 0.2% by weight.

One preferred embodiment of the water resistant formulation will comprises from 25 to 35 wt % of a PVOH and surfactant stabilized EVA resin, from 25 to 35 wt % of a PVOH and surfactant stabilized EVA resin with NMA and/or carboxyl function, 0 to 1 wt % of a crosslinker for NMA and/or carboxyl functional groups, 0 to 1 wt % of PVOH or borated PVOH, 0 to 5 wt % of a dibenzoate plasticizer 0.1 to 0.2 wt % of a preservative and defoamer, and 35 to 45 wt % water.

Also useful are polymer powders, which may be stabilized with protective colloid, and which are redispersible in water (redispersible powders). Such can be prepared, for example, by drying a polyvinyl alcohol-stabilized, aqueous dispersion of component polymers.

The following examples are presented for purposes of illustration and not limitation.

EXAMPLES

Adhesive tack was determined using the following protocol on an Instron or Texture Analyzer with a load cell of 5 kg: 42 lb basis weight Kraft liner paper and Single Face Corrugated substrates with 26 lb basis weight medium paper were placed in a controlled temperature and humidity room for at least 48 hours for the paper to equilibrate with the environment.

Adhesive was transfer coated onto 1 inch wide flute tip from a freshly drawn wet adhesive film of 0.002 inch thickness (2 wet mil) on a small glass plate. The coated flute was then mated with the liner paper under 100 gram compression and then failed orthogonally from the liner paper at 10 mm/s recording the peak force. This was repeated with clean substrates and freshly drawn adhesive film under the same Instron or Texture Analyzer parameters for a minimum of 5 times. The average peak force was then reported as the tack of the adhesive under the compression time applied. The compression time can be programmed to be any length in seconds but the inventors deemed it critical to monitor the tack at shorter compression times such as 5 seconds and 2 seconds.

The open time of this tack test was determined by the time it took for the coated flute tip to move down and contact the liner paper. This was largely dependent on the testing equipment's probe movement speed, compression speed, any software and hardware delay, and the initial flute to liner distance. The open times in the given examples were made constant so tack data can be compared.

Example 1

Water resistant adhesive formulation Samples A and B useful in the cold corrugating process of the invention to prepare single/double/triple wall boards at line speed in excess of 650 fpm, without applying heat to promote drying, were prepared using the components listed in Table 1. Sample A contained more of the PVOH and surfactant stabilized EVA component, less of the PVOH/borated PVOH component, and more water than Sample B.

TABLE 1

| Adhesive Components |
| --- |
| PVOH and surfactant stabilized EVA resin |
| PVOH and surfactant stabilized EVA resin with NMA and/or Carboxyl function |
| Crosslinker for NMA and/or Carboxyl functional groups |
| PVOH or Borated PVOH |
| Dibenzoate Plasticizer |
| Preservative and Defoamer |
| Water |

Example 2

The tack performance of adhesive Sample A and adhesive Sample B were compared to the tack performance of an example of an adhesive prepared in accordance with the teaching of U.S. Pat. No. 4,561,918 "Comparative Sample." Tack was performed according to the method described above. Results are shown in FIG. 1.

Example 3

Water resistance was tested using the TAPPI T-821 Wet Pins method.

The Comparative Sample and the Samples of Example 1 (Sample A and B) were used to prepare corrugated board using 26# medium C-flute, 42# Kraft liner with standard dimension of 2×5 inches. Wet adhesive was transfer coated to the flutes of the corrugated medium and the liner board placed in contact with the adhesive. Pressure was applied at 0.3 psi for about 30 seconds. 24 hours after bonding, a two hour soak test was conducted. Soaked samples were failed at 0.2 mm/s compression speed and the peak load in pounds were recorded. The Comparative Sample showed no water resistance and simply drifted apart within 2 minutes.

Example 4

The wet pin results of Samples A and B of Example 3 were compared with wet pin results of standard corrugated boards made with conventional starch adhesives and crosslinking water resistant additive, WRA (ketone aldehyde), prepared by the Stein-Hall process (comparative sample).

The comparative sample ("Stein-Hall Corn+WRA") was formulated in a Ringwood high shear mixer using a pearl corn carrier. The finished batch had a starch solids content of 27.0%. The viscosity, as measured by a Stein-Hall cup, was 33 seconds @ 108° F. To the finished adhesive, was added 1.5% of a standard ketone-aldehyde water resistant resin.

The results are shown in FIG. 2.

The invention claimed is:

1. The paperboard product prepared by a process comprising:
    applying a thin layer of a synthetic waterborne adhesive to a first substrate, and
    bringing a second substrate together with said first substrate such that said adhesive layer is located between said first substrate and said second substrate and wherein the substrates consist of at least one corrugated medium and at least one liner board, whereby the corrugated medium becomes bonded to the liner board; and
    wherein said adhesive comprises from about 25 to about 35 wt % of a polyvinyl alcohol and surfactant stabilized ethylene vinyl acetate resin emulsion, from about 22 to about 28 wt % of a polyvinyl alcohol and surfactant stabilized carboxy functional ethylene vinyl acetate resin emulsion, from about 3 to about 7 wt % of a polyvinyl alcohol and surfactant stabilized N-methylol acrylamide containing ethylene vinyl acetate resin emulsion, up to about 5 wt % of a plasticizer, and containing from about 35 to about 45 wt % water, and
    said adhesive has a solids content of greater than 40%, has a Brookfield viscosity (20 rpm, 72° F.) greater than 700 cps, is applied to a substrate at a coat weight of less than 0.004 inch and has a 2 second tack at 72° F., 50% Relative Humidity, of at least 50 gram force per linear inch flute length at an application level of 1.5 dry lbs/msf or less.

2. The paperboard product of claim 1 wherein the adhesive further comprises a preservative and/or a defoamer.

3. The paperboard product of claim 1 which is a corrugated board comprising at least two liner boards and at least one corrugated medium.

* * * * *